US008831795B2

(12) United States Patent
Cabos

(10) Patent No.: US 8,831,795 B2
(45) Date of Patent: Sep. 9, 2014

(54) DATA SYNCHRONISATION FOR A FLIGHT INFORMATION SYSTEM

(75) Inventor: Ralf Cabos, Singapore (SG)

(73) Assignee: Flight Focus Pte. Ltd., Singapore (SG)

( * ) Notice: Subject to any disclaimer, the term of this patent is extended or adjusted under 35 U.S.C. 154(b) by 35 days.

(21) Appl. No.: 13/084,577

(22) Filed: Apr. 12, 2011

(65) Prior Publication Data

US 2012/0143405 A1 Jun. 7, 2012

(30) Foreign Application Priority Data

Apr. 12, 2010 (WO) .................. PCT/IB2010/051562

(51) Int. Cl.
*G01C 23/00* (2006.01)
*G07C 5/00* (2006.01)

(52) U.S. Cl.
CPC ...................................... *G07C 5/008* (2013.01)
USPC ............................................................... 701/3

(58) Field of Classification Search
CPC ........... G05D 1/00; G05D 1/10; G01C 23/00; G08G 5/00
USPC ........................................... 701/3, 29.1, 31.5
See application file for complete search history.

(56) References Cited

U.S. PATENT DOCUMENTS

2008/0126111 A1* 5/2008 Loda ................................ 705/1
2009/0233597 A1* 9/2009 Wright et al. ................. 455/433

* cited by examiner

*Primary Examiner* — Kim T Nguyen
(74) *Attorney, Agent, or Firm* — Taylor English Duma LLP

(57) ABSTRACT

A method (49) for synchronizing flight information that comprises a step of connecting airborne components (21) of a flight information system (10) and ground-based components (24) of the flight information system (10), a step of comparing flight data stored with the airborne components (21) and content stored with the ground-based components (24), and a step of synchronising (66, 69) the airborne components (21) and the ground-based components (22).

13 Claims, 6 Drawing Sheets

DATA SYNCHRONISATION FOR A FLIGHT INFORMATION SYSTEM

The present application relates to a method of data synchronisation for a flight information system. The present application also relates to the flight information system that comprises an electronic flight bag.

BACKGROUND

In commercial aircraft applications, it is often necessary to collect, reconcile and update a wide variety of flight information, such as airworthiness data, weather data, fuel load data and flight plans. The flight information is stored in a plurality of peer-to-peer databases. These activities of collecting, reconciling and updating are collectively known as "synchronizing" the databases. In relation to an aircraft, the electronic flight bag of the aircraft, which is a part of the flight information system, needs to be synchronised with other components of the flight information system for flight operation. The synchronisation process can be improved for higher flight operation efficiency and lower operating costs for airlines.

BRIEF SUMMARY

The present application provides a method for synchronising flight information comprising a step of connecting airborne components of a flight in-formation system and ground-based components of the flight information system, a step of comparing flight data stored with the airborne components and content stored with the ground-based components, and a step of synchronising the airborne components and the ground-based components.

The method can further comprise a step of providing an aircraft master document list at the airborne components and a ground-based document list at the ground-based components for the comparing.

The step of synchronising comprises a step of updating one or both of the content and the flight data.

The method can further comprise a step of filtering received documents and amendments for relevance of a flight.

The method can further comprise a step of reporting errors and corrections between the air-borne components and the ground-based components.

The step of connecting can comprise a step of selecting means of communication between the airborne components and the ground-based components depending locations of the airborne components of an aircrafts.

The method can further comprise a step of receiving the flight information from any of external data sources and the airborne components related to the flight.

The method can further comprise a step of sending a document amendment package from the ground-based components to the airborne components for the synchronising.

The method can further comprise a step of receiving an aircraft data amendment package by a secure terminal on the ground for transmitting to the airborne components.

The method can further comprise a step of communicating the flight data with the ground-based components via secure web connections.

The step of synchronising can further comprise a step of updating the flight data between a data centre and external data sources.

The present application also provides a flight information system that comprises ground-based components, airborne components that are configured to communicate with the ground-based components. The ground-based components are configured to synchronise flight information with the airborne components of the airborne components.

The Electronic Flight Bag can comprise a main onboard computer loaded with onboard applications and flight data, a display connected to the main onboard main computer. The main onboard computer is configured to synchronise the flight data with a flight information service provider via communication connections of the main onboard computer.

The application also provides a data centre for providing flight information that comprises an airline communication channel for receiving flight information from customer airlines, computers for managing the flight information, and a transmission link for exporting sorted flight information.

The present application provides a communication gateway system for providing flight information that comprises a secure website connections for accessing the flight information.

DETAILED DESCRIPTION

In the following description, details are provided to describe embodiments of the application with references to the above-mentioned figures. It shall be apparent to one skilled in the art, however, that the embodiments may be practised without such details. These figures comprise parts that have same reference numbers. Description of these parts is hereby incorporated by reference.

Figure 1:
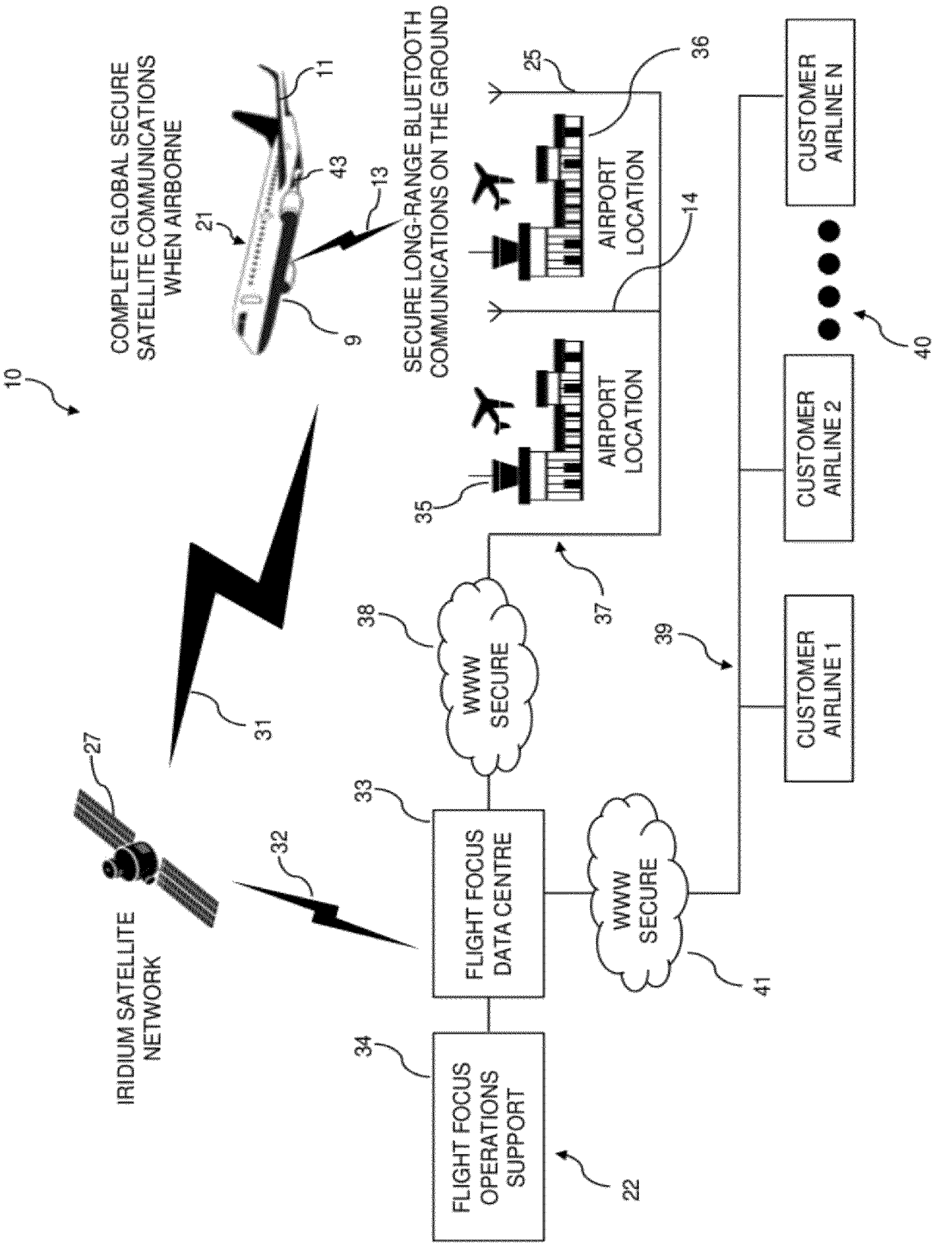
FIG. 1 illustrates an operation diagram of a flight information system.

In particular, FIG. 1 illustrates an operation diagram of a flight information system 10. The flight information system 10 comprises airborne components 21 and ground-based components 22. The flight information system 10 also comprises an Iridium Satellite Network 27 and customer airlines 40 that communicate with the airborne components 21 and the ground-based components 22.

The airborne components 21 comprise an electronic flight bag 9 that is installed on an aircraft 11. The electronic flight bag 9 has a USB (universal serial bus) connection 43. The airborne components 21 communicate with the ground-based components 22 for exchanging flight information related to a flight. The flight information includes flight data that is related to aircraft management, flight operation and crew administration. For example, weather conditions along a flight route, maintenance schedules of the aircraft 11, fuel consumption and loading optimisation of the aircraft 11 are parts of the flight information that are collected and updated by the flight information system 10.

The ground-based components 22 include a data centre 33 and an operation support centre 34. The operation support centre 34 provides operational support to the data centre 34 for maintaining its routine operation. The data centre 33 is connected to a first antenna 14 and a second antenna 25 for Bluetooth communication. The first antenna 14 is located at an origination airport 35, whilst the second antenna 25 is located at a destination airport 36. The origination airport 35 refers to an airport of flight departure, whilst the destination airport 36 refers to an airport of flight arrival.

The data centre 33 is connected to the two antennas 14, 25 via a first secure web connection 38 and a transmission link 37. The data centre 33 is also connected to the customer airlines 40 via a second secure web connection 41 and an airline communication channel 39.

The electronic flight bag 9 and the data centre 33 communicate with each other via two modes depending on the location of the aircraft 11. In a first mode, the electronic flight bag 9 sends the flight information to the Iridium Satellite Network 27 via a first data link 31 when the aircraft 11 is flying. The Iridium Satellite Network 27 further transmits the flight information to the data centre 33 via a second data link 32.

In a second mode, when the aircraft 11 is landed in one of the airports 35, 36, the electronic flight bag 9 communicates with the data centre 33 via a Bluetooth communication channel 13. The Bluetooth communication channel 13 provides secure long-range Bluetooth communications. In practice, the electronic flight bag 9 transmits flight data to the data centre 33 via one of the antennas 14, 25.

Figure 2:
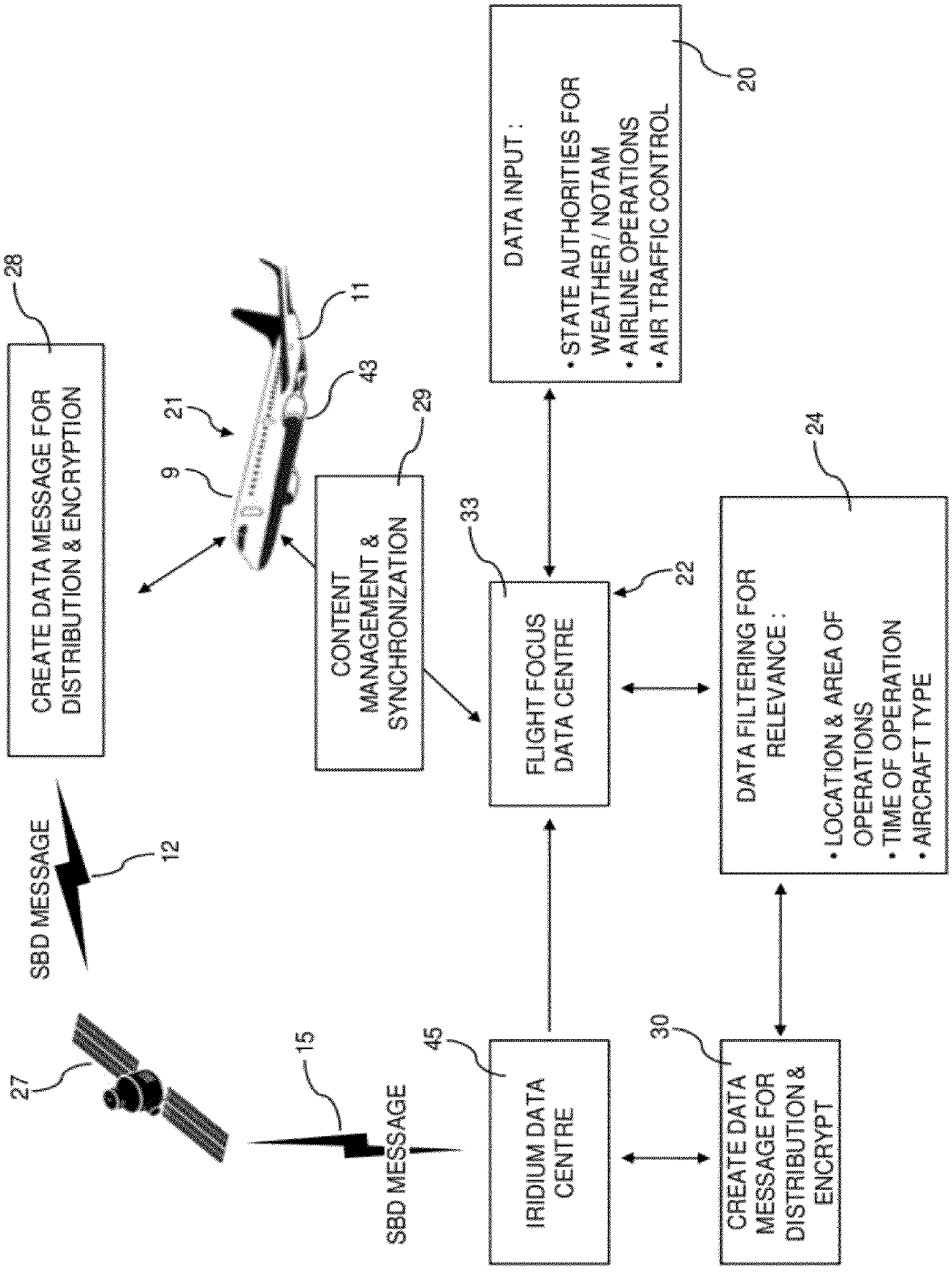
FIG. 2 illustrates data flows between an aircraft and a data centre of the flight information system.

FIG. 2 illustrates data flows between the aircraft 11 and the data centre 33 via satellite communication channels 12, 15. The data flows involve the electronic flight bag 9, the Iridium Satellite Network 27, the data centre 33 and an Iridium data centre 45.

When the aircraft 11 is in the air, the electronic flight bag 9 creates data messages for distribution and encryption 28. The electronic flight bag 9 sends the data messages in the form of SBD (short burst data) messages to the Iridium Satellite Network 27 via a first satellite communication channel 12. The Iridium Satellite Network 27 then forwards the SBD messages to the Iridium data centre 45 via a second satellite communication channel 15. The Iridium data centre 45 relays the SBD messages to the data centre 33 afterwards.

The electronic flight bag 9 talks to the data centre 33 via the Bluetooth communication channel 13 (see FIG. 1) when the aircraft 11 is landed in one of the airports 35, 36. The Bluetooth communication channel 13 enables a higher data transfer rate than the Iridium Satellite Network 27. The Bluetooth communication channel 13 facilitates content management and synchronisation 29 between the electronic flight bag 9 and the data centre 33.

In addition to the open communication link between the Iridium data centre 45 and the data centre 33, which is described above, the Iridium data centre 45 and the data centre 33 also have a secure communication link between them. When using the secure communication link, the Iridium data centre 45 creates and distributes encrypted data message 30 at one end. At the other end, the data centre 33 filters the encrypted data message for relevance 24, which is based on location and area of operations, time of operation, and aircraft type in relation to the flight. In the meantime, the data centre 33 gets other data inputs 20, including weather data and NOTAM (Notice To Airmen) from State authorities, flight information from airline operations, and airport information from air traffic controls.

Figure 3:
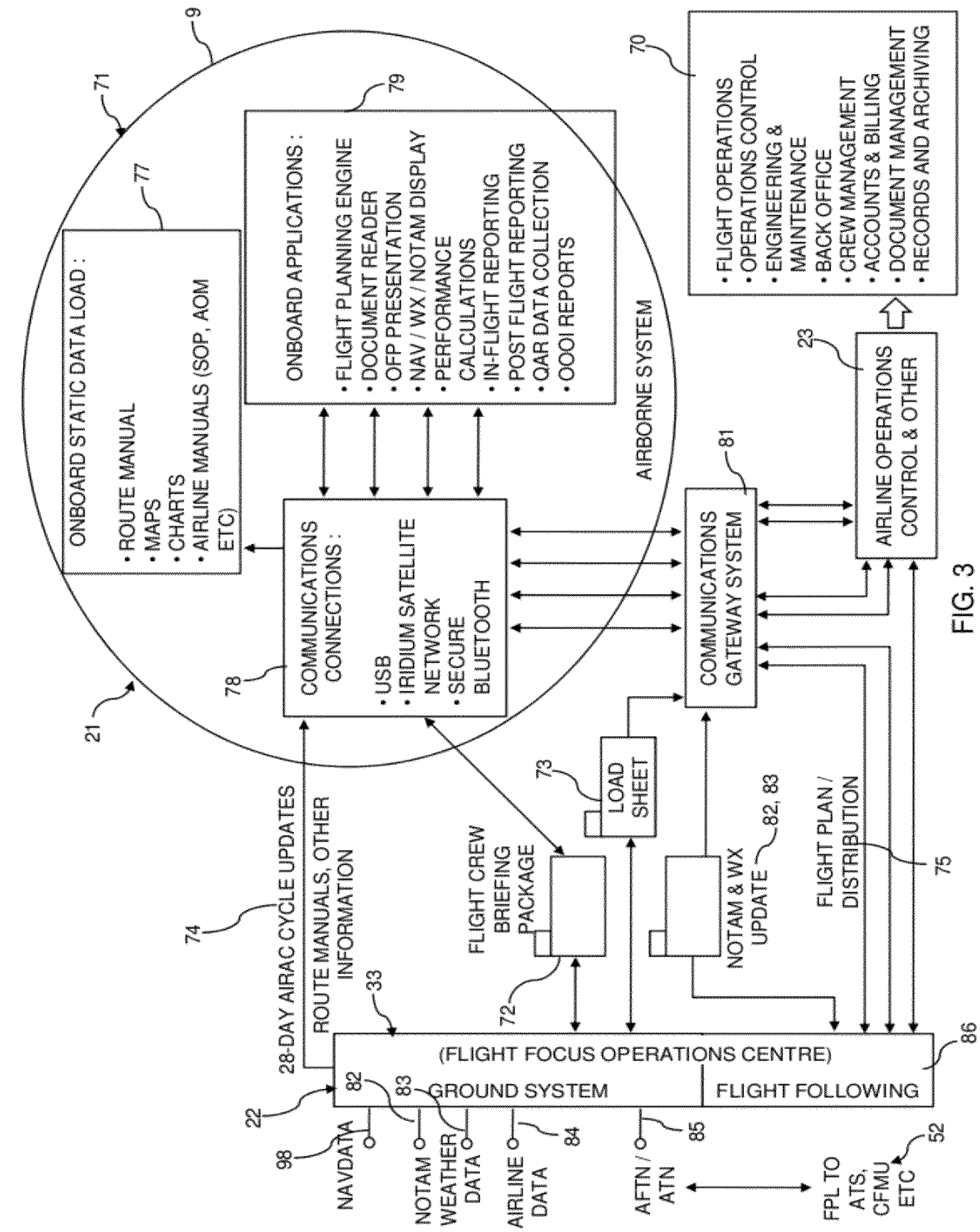
FIG. 3 illustrates connections and the data flows between ground-based components and airborne components of the flight information system.

FIG. 3 illustrates connections and data flows between the ground-based components 22 and the electronic flight bag 9. The ground-based components 22 and the electronic flight bag 9 are connected to each other via a communication gateway 81. The communication gateway 81 is part of the ground-based components 22 that further include the data centre 33 and the operation support centre 34 (see FIG. 1). The communication gateway 81 comprises the transmission link 37, the first secure web connection 38, and the antennas 14, 25 that are shown in FIG. 1.

According to FIG. 3, the electronic flight bag 9 comprises onboard applications 79, communication connections 78 and onboard static data load 77, which form an airborne system 71. The onboard applications 79 and the onboard static data load 77 are installed in an electronic database of the electronic flight bag 9.

The onboard static data load 77 comprises route manual, maps, charts and airline manuals. Examples of the airline manuals include SOP (standard operation procedure) and AOM (airport operations manual). The onboard applications 79 includes flight planning engine, document reader, OFP presentation, NAV (navigation)/WX/NOTAM display, performance calculations, in-flight reporting, post-flight reporting, QAR (quick access recorder) data collection, and OOOI (out, off, on, in signals generated from the aircraft during different phases of the flight) reports.

The onboard applications 79 and the onboard static data load 77 enable pilots to carry, read, and search electronic documents, manuals and charts for generating and transmitting enroute reports, crew briefing packages and flight plans. The communication connections 78 allows the electronic flight bag 9 to communicate with the ground based components 22 via the communication connections 78, which include the USB connection 43, the Iridium Satellite Network 27 and the Bluetooth communication channel 13.

The onboard static data load 77 is continuously updated. An onboard flight planning engine, which is one of the onboard applications 79, constructs and dispatches flight plans to air traffic services. The electronic flight bag 9 also dispatches flight crew briefing packages.

The electronic flight bag 9 is connected to AFTN (aeronautical fixed telecommunication network), ATN (aeronautical telecommunication network) and the aircraft's weather radar. The electronic flight bag 9 is integrated with ADS-B (Automatic dependent surveillance-broadcast) for aircraft positional information and with associated warning systems, such as TCAS (Traffic alert and Collision Avoidance System).

The electronic flight bag 9 is data driven. The maps and charts are dynamically updated and linked to an ARINC (Aeronautical Radio, Incorporated) bus on the aircraft 11 for providing positional information from the aircraft's navigation system.

The electronic flight bag 9 interacts with the data centre 33 for automatic synchronisation such that the electronic flight bag 9 and the data centre 33 update each other with the latest flight information.

According to FIG. 3, the data centre 33 receives and process flight information including Navdata (navigation data) 98, NOTAM 82, weather data 83, airline data 84 and FPL (flight plan). The data centre 33 receives the FPL via AFTN/ATN 85 (aeronautical fixed telecommunications network/air traffic control). The FPL is also communicated to ATS (air traffic services), CFMU (Central Flow Management Unit of EUROCONTRO), and other organisations. The data centre 33 presents processed data as the flight information for synchronisation with other parties, including the electronic flight bag 9.

FIG. 3 further shows that the ground-based components 22 comprise an airline operation unit 23, which includes the customer airlines 40 (see FIG. 1). The airline operation unit 23 is connected to both the communication gateway system 81 and the data centre 33. Some of the flight information are collected by the airline operation unit 23 for generating flight data 70, which is related to flight operations, operations control, engineering maintenance, back office management, crew management, accounts and billing, document management, and records and archiving.

The data centre 33 communicates with the airline operation unit 23 either directly or via the communication gateway system 81. In particular, the data centre 33 distributes load sheets 72, the NOTAM 82 and WX (weather data) 83 via the communication gateway system 81. The data centre 33 also distributes flight plans 75 to the airline operation unit 23 directly.

The onboard applications 79 interact with the data centre 33 for synchronising the flight information continually. In contrast, the onboard static data load 77 is updated periodically. For example, the electronic flight bag 9 receives 28-day AIRNIC cycle updates on route manuals and other information 74 from the data centre 33.

Figure 4:
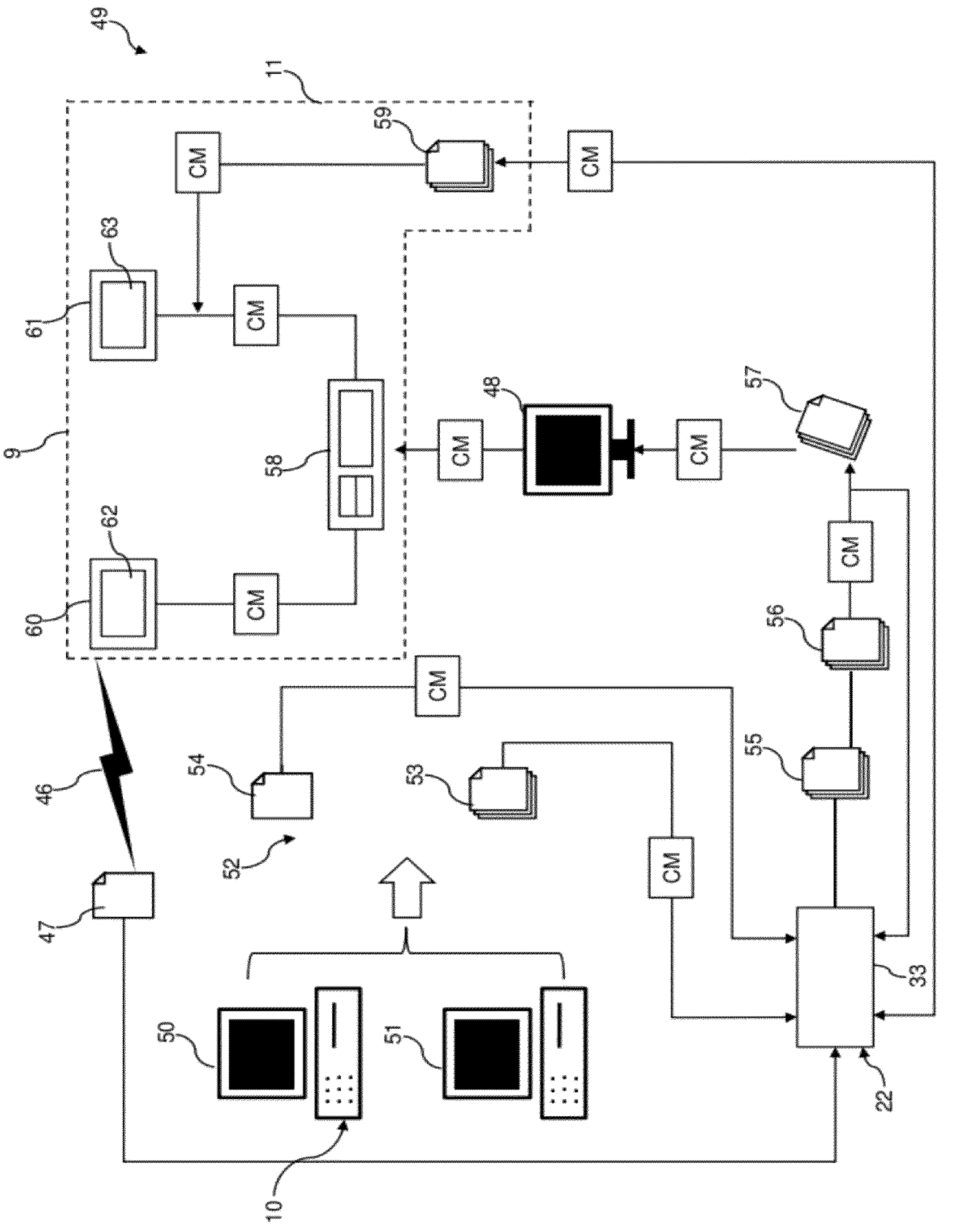
FIG. 4 illustrates a diagram of a data synchronization process between the airborne components and the ground-based components.

FIG. 4 illustrates a diagram of a data synchronization process 49 between the electronic flight bag 9 and the data centre 33. The data centre 33 is connected to the electronic flight bag 9 via a secure terminal 48 or via an aircraft communication channel 46. The aircraft communication channel 46 includes the communication connections 78 (see FIG. 3). The secure terminal 48 includes the first secure web connection 38 and the transmission link 37 (see FIG. 1). The secure terminal 48 allows authorised personnel to communicate with the airborne components 21 at one of the airports 35, 36.

According to FIG. 4, the electronic flight bag 9 comprises a first display unit 62, a second display unit 63 and an onboard main computer 58. The onboard main compute 58 is connected to both of the display units 62, 63. The onboard main computer 58 works inter-dependently from other computers installed the aircraft 11 (see FIG. 1). The first display unit 62 is provided for showing a first content inventory 60 whilst the second display unit 63 is provided for showing a second content inventory 61. The main onboard computer 58 hosts an aircraft master document list 59 that is periodically updated.

The FIG. 4 also shows a first external data source 50 and a second external data source 51 that are parts of the flight information system 10. The first external data source 50 includes the customer airlines 40 (see FIG. 1) that send the flight information 52 of crew management, engineering data, maintenance data and flight operation in the form of a data amendment package 53 to the data centre 33. The second external data source 51 provides the flight information that is received from official bodies, such as Bureaus of Meteorology and Federal Aviation Administration. The second external data source 51 sends the flight information in the form of advance notification bulletin 54 to the data centre 33.

In the data synchronisation process 49, the data centre 33 firstly receives the flight information 52 that includes the data amendment package 53 and the advanced notification bulletin 54 from the external data sources 50, 51. In a filtering step, the data centre 33 compares the received flight data 52 with previously stored flight information for identifying differences between them. In a following step, the data centre 33 provides an aircraft list 55 and each entry of the aircraft list 55 contains a corresponding reference to a ground master document list 56. The ground master document list 56 contains entries that show names and contents of the documents in the electronic flight bag 9.

In a data processing step, the flight information is sorted according to the ground master document list 56. If discrepancies are identified between the flight information of the electronic flight bag 9 and the data centre 33, the data centre 33 generates an aircraft data amendment package 57 which contains the changes and amendments. If there is no previous flight information held by the data centre 33 but new flight information has been received, the ground master document list 56 is changed in response to directions from the customer airlines 40, a data package that contains new and amended flight information is created at the data centre 33. For example, if the aircraft 11 is scheduled to fly a new route, flight information of the new route is added to the ground master document list 56 and the flight information of the new route is compiled for distribution to the electronic flight bag 9 on the aircraft 11.

In another situation, a new document is received by the data centre 33 that is required to be carried onboard the aircraft 11. The ground master document list 56 at the data centre 33 is updated on direction from the customer airlines 40. The new document is then included into the aircraft data amendment package 57 for delivering to the electronic flight bag 9.

In a transferring step, the aircraft data amendment package 57 is transmitted to the aircraft 11 via the communication connections 78 (see FIG. 3).

In a receiving step, the onboard main computer 58 receives the aircraft data amendment package 57 via the secure terminal 48. The onboard main computer 58 uses the received aircraft data amendment package 57 update its aircraft master document list 59.

Upon the completion of the updating the aircraft master document list 59, the electronic flight bag 9 sends a confirming list of changes to the data centre 33. A data processing unit at the data centres 33 checks if the flight information in the electronic flight bag 9 has been correctly updated. The data centre 33 keeps a record of all of changes that have been applied.

If the data synchronisation process 49 has not been completed successfully, an error message 47 is generated by the data centre 33 and sent to the electronic flight bag 9 for the pilot's decision.

Figure 5:
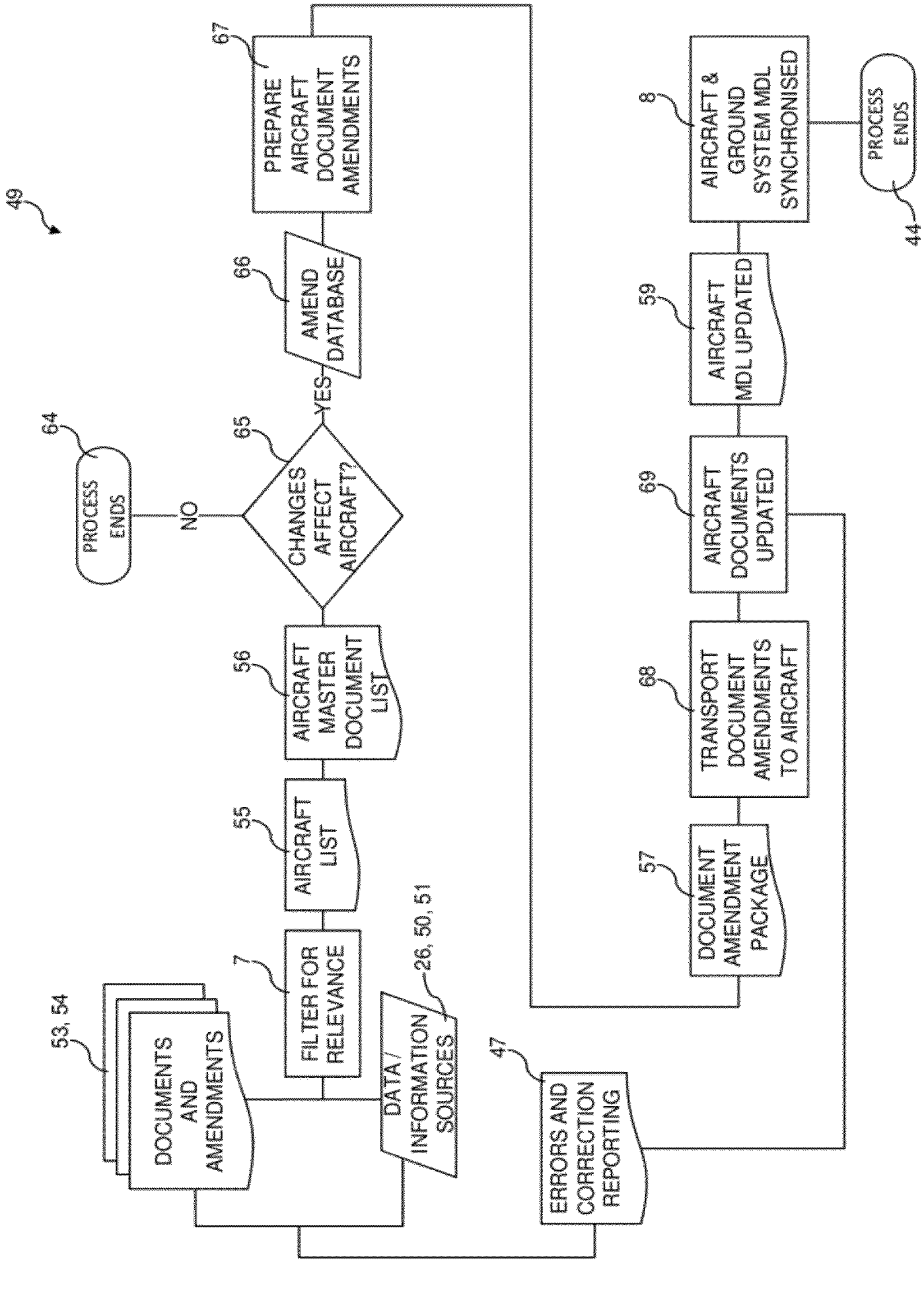
FIG. 5 illustrates a flow chart on how the flight information is updated as an example of the data synchronisation process.

FIG. 5 illustrates a flow chart of how the flight information is updated, which is an example of the data synchronisation process 49.

In a collecting step, documents and amendments, which are in the forms of documents and amendments 53, 54, are compiled at the data centre 33. In a filtering step 7, the data center 33 examines the documents and amendments 53, 54 for relevance according to the aircraft list 55.

The aircraft list 55 is a compilation of electronic documentation and aeronautical data 84 for assigned aircrafts. A flight information service provider is held responsible for providing and maintaining the aircraft list 55 at the data centre 33. The aircraft list 55 includes changes of the flight information in relation to aircrafts of predetermined parameters, such as types of aircrafts, types of flight, departure and destination points, routes and timings of a flight. Other factors of operational significance are also parts of the aircraft list 55, including a time at which the flight information becomes current for use and a time at which the flight information expires.

In the filtering step 7, the data centre 33 also uses an aircraft master document list 59, which lists airline data 84 held at the ground-based components 22. The airline data 84 holds a record of all documents and data held by the airborne components 21 of the aircraft 11.

The flight information of the aircraft 11 that is held in the aircraft list 55 is compared 65 with the aircraft master document list 56 (see FIG. 4) for identifying differences. If no difference is found, the synchronisation process terminates at a first process end 64. If the differences are found and they affect the flight information of the aircraft 11, the aircraft master document list 56 is amended 66. An aircraft data amendment package 57 (see FIG. 4) is prepared 67 by the data centre 33. Afterwards, the aircraft data amendment package 57 is transported 68 to the electronic flight bag 9. The transportation 68 is performed via the Bluetooth communication channel 13 (see FIG. 1) when the aircraft 11 is at the origination airport 35. The aircraft master document list 59 is subsequently updated 69 to be the same as a latest copy of the ground master document list 56. Hence, the flight information system 10 is synchronised 8 and the data synchronisation process 49 terminates at a second process end 44.

The pilots report to the data centre 33 on the error message 47 (see FIG. 4) after updating 69 the aircraft master document lists 59. The error message 47 is reported when there is a change to a route manual. The route manual is a composition of documents on maps and charts that the pilots use during a flight for operating of the aircraft 11. The route manual is subject to review and update every 28 days in accordance with a published schedule of predetermined dates known as the Aero-nautical Information Regulation and Control or AIRAC Cycle. The schedule is published regularly by the International Civil Aviation Organisation (ICAO).

In the present change to the route manual, a country changes a departure track when the aircraft 11 departs from a runway at the origination airport 35. The change is made firstly in the AIP (Aeronautical Information Publication) of the country. The flight information service provider of the route manual monitors the change and introduces the change to contents of the route manual. The changes to the route manual are considered as a part of the documents and amendments 53, 54 for the synchronisation.

After receiving the change, the data centre 33 identifies that the change of the route manual affects a departure chart of the origination airport 35. The data centre 33 filters 7 the aircraft list 55 and identifies that the aircraft 11 is affected by the changes. The data centre 33 amends 66 its database 66 according to the changes in relation to the aircraft 11 and prepares aircraft document amendments 67 in the form of the aircraft data amendment package 57. The aircraft data amendment package 57 is also created in recognition of the date/time that the changes will take place. The data centre 33 sends the aircraft data amendment package 57 to the aircraft 11 when the change is imminent for flight operation. The aircraft data amendment package 57 is transported to the aircraft 11 via the Bluetooth communications channel 13. The airborne components 21 accept the aircraft data amendment package 57 and updates the aircraft master document list 59. The airborne components 21 then determine dates when the change takes effect and when the change expires. The aircraft master document list 56 is updated 59 and the flight information system 10 is synchronised 8.

FIG. 5 also illustrates how the ground-based components 22 are updated when the electronic flight bag 9 initiates changes. In this case, an operational flight plan (OFP) and a flight crew briefing package (FCBP) are created by the onboard applications 76 using the onboard applications 76 (see FIG. 3). The onboard applications 76 include the flight planning engine that draws data and information from a mission data subset to create the OFP and the FCBP. The mission data subset derives from an advance notification bulletin 54 in the onboard main computer 58. The advance notification bulletin 54 is received from the external data sources 50, 51 that provide the NOTAM 82, the weather data 83, the navigation data 98, and other operational data with relevancy to the flight.

Completed OFP and FCBP are sent to the data centre 33 via the communication connections 78. The data centre 33 further communicates the OFP and the FCBP with external agencies 69. In the mean time, the data centre 33 updates its recorded flight information with regard to the OFP and FCBP.

In the above-mentioned the step 7 of filtering for relevance, the data centre 33 validates received documents and amendments 53, 54 according to their reasonableness, completeness and accuracy. Validated documents and amendments 53, 54 are analysed in relation to the aircraft list 55, which enumerates all aircrafts under operational surveillance by the operator of the data centre 33. The aircraft list 55 provides the changes with respect to a number of predetermined parameters, such as type of aircraft, type of flight, departure and destination points, route of the flight, timing that the flight, and effectives dates of the flight information. If the changes to the flight information are likely to affect continuing operations of the flight 65, the changed flight information is passed to the aircraft 11.

The pilots usually send en route reports to the data centre 33 and to the customer airlines 40 for providing updates the flight. The updates include a present position of the aircraft 11, fuel remaining and an airborne weather report. The pilots use the onboard applications 79 to construct the en route report. After construction of the en route report, the pilots transmit the en report from the electronic flight bag 9 to the data centre 33 via the communication gateway 81 (see FIG. 3).

Upon a demand for additional reports, the pilots use the onboard applications 79 to generate automatic en route reports for flight following and operational monitoring of the flight. The automatically generated en route reports are produced at predetermined times with description on geographical locations of the aircraft 11 as coordinate values. These coordinate values are transmitted from the aircraft 11 to the data centre 33 via the Iridium Satellite Network 27. These coordinate values are used to plot the progress of the flight from the origination airport 35 to the destination airport 36.

The data centre 33 analyses the position of the aircraft 11 and correlates this positions with the flight information to ensure that the latest update is available at the data centre 33 for operational surveillance and information updating to the flight. After the analysis at the data centre 33, the updates are sent back to the aircraft 11 upon request.

After dispatching a flight plan (FPL) to air traffic services and other flight information service providers via the AFTN and/or ATN 44, the ground-based components 22 monitors the progress of the flight in relation to the estimated time of departure (ETD) shown in the flight plan. The onboard applications 79 monitor the ETD in terms of adherence to the ETD and determine requirements for the flight planning application to create a delay (DLA), a cancellation (CNL) or other types of message. The message includes a change message (CHG) if there are alterations to the previous flight plan in accordance with the standards and recommended practices prescribed by the ICAO. For example, if the flight is delayed more than 30 minutes beyond the ETD shown in the FPL, the onboard applications 79 create a DLA message and send it to the data centre 33 via the communications connections 78 after confirmation by the pilots.

The onboard applications 36 provide similar functionality to create and dispatch a modification or a change message (CHG) when this is required by a change to parts of the dispatched FPL. In this case, if the airborne components 21 receives an update to the weather or the NOTAM information after the creation of FPL and a new flight plan, the flight planning engine creates the new FPL and OFP, presents these to the pilots and sends a CHG to the data centre 33. A similar situation exists for the creation and dispatch of a cancellation message (CNL) if the flight is cancelled.

The DLA, CNL and CHG messages are also sent to the ground-based based components 22 as part of the synchronisation of messages and content inventory between the airborne and ground-based components 21, 22.

The operation support centre 34 manages communication links and interfaces for providing the flight information and transmitting flight plans (and related ATS messages) to air traffic services agencies. These communication links may include transmissions via TCP/IP, or the AFTN or the ATN.

In the case of the AFTN and ATN, a flow management unit has a specific address known to the AFTN and ATN. An AFTN address consists of eight alphabetical characters, which signify the flight information region, the location of the facility, and the department of the facility. For example, an AFTN address for Singapore Changi Airport control tower is WSSSZTZX, where WSSS is the indicator for Singapore Changi Airport and ZTZX is the suffix for the control tower.

The onboard applications 79 and the flight planning applications in the ground-based components 22 compile a list of the flight information region (FIR) boundaries and show these in a route section of the FPL when compiling a flight plan. The route of the flight is determined by the flight planning applications e with reference to aeronautical data and information held by the flight information system 10. The flight planning applications uses this aeronautical data and information during the construction phase of the OFP and FPL. The flight planning applications consult the weather information 42 during the construction and optimisation phase of the flight planning process. At the end of construction and optimisation processes, OFP and FPL is produced. ICAO standards prescribe that FPL is required to be sent to a specific AFTN or ATN address for each flight.

The ground-based components 22 analyse the route of the flight after an FPL is received from the airborne components 21 and create the required AFTN/ATN addressees by referencing to the route structure. If additional addressees are required for a particular route, for example if an AFTN/ATN addressee is required for an en route military facility, these are held in the ground-based components 22. After analysing the route structure and the application of the AFTN/ATN addressees, the ground-based components 22 send the FPL and other associated messages to the communication gateway system 81 for delivery via the AFTN or ATN to the message addressees.

Figure 6:
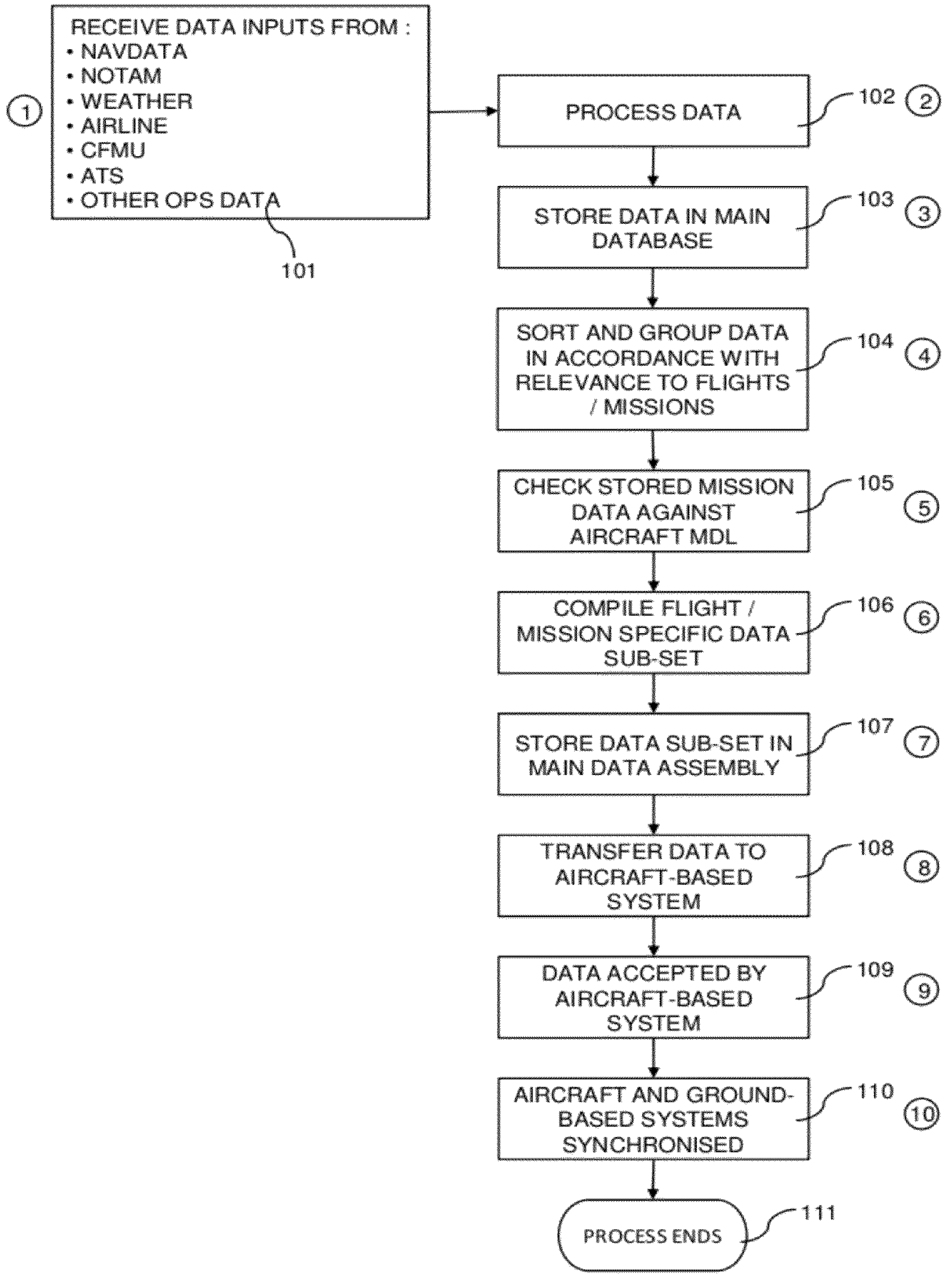
FIG. 6 illustrates a process of flight information synchronization between the airborne components and the ground-based components.

FIG. 6 illustrates a process of flight information synchronizing between the airborne components 21 and the ground-based components 22.

In a first step 101, the ground-based components 22 of the flight information system 10 receives the flight information 52 such as the navigation data 98, the NOTAM 82, the weather data 83, the airline data 84 and flight information from the flow management unit (CFMU) or other input data.

In a second step 102, the flight information 52 is processed by the ground-based components 22 of the flight information system 10.

In a third step 103, the ground-based components 22 store the processed flight information 52 in a main database of the data centre 33.

In a fourth step 104, the flight information 52 in the main database is sorted and grouped in accordance with relevance to the airline data 84 (see FIG. 3) relating to commercial, technical, engineering, regulatory, and personnel areas of the airline.

In a fifth step 105, the sorted and flight information 52 is checked against the master document list (MDL) 59 (see FIG. 4) relating to flight data stored on the aircraft 11. The onboard flight data has been synchronized with the ground master documents list 56 (see FIG. 4) so as not to duplicate the flight data.

In a sixth step 106, a flight or mission specific data subset is constructed at the data centre 33. In a seventh step 107, flight or mission specific data subset is stored in a data subset main assembly area. The mission data subset is created by taking data that is required by a particular flight.

In an eighth step 108, the flight specific data is transferred to the airborne components 21 at a variable parameter time set by the customer airlines 40 (see FIG. 1).

In a ninth step 109, the flight specific data is either accepted or rejected by the electronic flight bag 9 for use depending on suitability.

In a tenth step 110, the electronic flight bag 9 and the data centre 33 are synchronized using communications connections 78 (see FIG. 3) so that the data centre 33 has a complete knowledge of the data 52 that is with the airborne components 21.

The synchronization process terminates 111 when the flight information at the electronic flight bag 9 and at the data centre 33 are kept at the latest and tally with each other.

Although the above description contains much specificity, these should not be construed as limiting the scope of the embodiments but merely providing illustration of the foreseeable embodiments. Especially the above stated advantages of the embodiments should not be construed as limiting the scope of the embodiments but merely to explain possible achievements if the described embodiments are put into practise. Thus, scopes of the embodiments should be determined by the claims and their equivalents, not by the examples given.

Reference Numbers

7 filtering for relevance
8 master document lists synchronised
9 electronic flight bag
10 flight information system
11 aircraft
12 first satellite communication channel
13 Bluetooth communication channel
14 first antenna
15 second satellite communication channel
20 data input
21 airborne components
22 ground-based components
23 airline operations unit
24 data filtering
25 second antenna
26 various data sources
27 Iridium Satellite Network
28 create data message
29 content management and synchronisation
30 create data message
31 first data link
32 second data link
33 data centre
34 operation support centre
35 origination airport
36 destination airport
37 transmission link
38 first secure web connection

39 airline communication channel
40 customer airlines
41 second secure web connection
42 second data network
43 USB connection
44 second process end
45 Iridium data centre
46 aircraft communication channel
47 error message
48 secure terminal
49 data synchronisation process
50 first external data source
51 second external data source
52 flight information
53 data amendment package
54 advance notification bulletin
55 aircraft list
56 ground master document list
57 aircraft data amendment package
58 onboard main computer
59 aircraft master document list
60 first content inventory
61 second content inventory
62 first display unit
63 second display unit
64 first process end
65 changes affect aircraft
66 amended database
67 prepare aircraft document amendments
68 transport document amendments to aircraft
69 aircraft documents updated
70 flight data
71 airborne system
72 flight crew briefing package
73 load sheet
74 28-day AIRAC cycle updates
75 flight plan distribution
77 onboard static data load
78 communication connections
79 onboard applications
81 communication gateway system
82 NOTAM
83 weather data
84 airline data
85 AFTN/ATN
86 database amendments
98 Navdata
101 first step
102 second step
103 third step
104 fourth step
105 fifth step
106 sixth step
107 seventh step
108 eighth step
109 ninth step
110 tenth step
111 process end

The invention claimed is:

1. A method for synchronising flight information on-board an aircraft, the method comprising:

communicatively connecting airborne components of a flight information system and ground-based components of the flight information system by a satellite radio link, the ground-based components comprising a data centre and a ground-based aircraft master document list, the airborne components comprising an on-board main computer, an airborne aircraft master document list, and an electronic flight bag containing electronic documents, the ground-based aircraft master document list and the airborne the aircraft master document list comprising names and contents of the electronic documents in the electronic flight bag;

receiving, at the data centre, new flight information for the aircraft;

comparing the ground-based aircraft master document list with the new flight information to determine whether there are differences that affect the electronic documents in the electronic flight bag;

upon determining there are differences that affect the electronic documents in the electronic flight bag, amending the ground-based aircraft master document list and generating a data amendment package based on the differences;

transmitting the corresponding data amendment package from the data centre to the electronic flight bag via the satellite radio link;

amending, by the on-board main computer, the airborne aircraft master document list to be the same as the ground-based aircraft master document list using the data amendment package; and updating, by the on-board main computer, the electronic flight bag to contain the electronic documents contained in the airborne aircraft master document list.

2. The method of claim 1, further comprising filtering the new flight data for relevance of a flight of the aircraft.

3. The method of claim 1, further comprising reporting errors and corrections between the airborne components and the ground-based components.

4. The method of claim 1, further comprising receiving the flight information from one or more of a customer airline, an official body and the airborne components related to a flight.

5. The method of claim 1, further comprising receiving the new flight information at the data centre via secure web connections.

6. The method of claim 1, wherein the flight information comprises one or more of NOTAMs, navigation data, weather data and airline data.

7. The method of claim 1, wherein the electronic documents comprise one or more of route manuals, maps, charts, and airline manuals.

8. A method for synchronising flight information on-board aircraft, the method comprising:

communicatively connecting ground-based components of a flight information system and airborne components of the flight information system on-board a plurality of aircraft by a satellite radio link, the ground-based components comprising a data centre and an aircraft list identifying each of the plurality of aircraft and a ground-based aircraft master document list corresponding to the aircraft, the airborne components comprising a main computer, an airborne aircraft master document list, and an electronic flight bag containing electronic documents on-board each of the plurality of aircraft, the ground-based aircraft master document lists and the airborne the aircraft master document lists comprising names and contents of the electronic documents in the electronic flight bag of each of the plurality of aircraft;

receiving, at the data centre, new flight information;

filtering the new flight information to identify relevance to a first aircraft of the plurality of aircraft according to the aircraft list;

comparing the ground-based aircraft master document list corresponding to the first aircraft with the new flight information to determine whether there are differences that affect the electronic documents in the electronic flight bag of the first aircraft;

upon determining there are differences that affect the electronic documents in the electronic flight bag, amending the ground-based aircraft master document list corresponding to the first aircraft and generating a data amendment package based on the differences;

transmitting the data amendment package from the data centre to the first aircraft via the satellite radio link;

amending, by the main computer on-board the first aircraft, the airborne aircraft master document list to be the same as the ground-based aircraft master document list corresponding to the first aircraft using the data amendment package; and updating, by the main computer, the electronic flight bag of the first aircraft to contain the electronic documents contained in the airborne aircraft master document list.

9. The method of claim 8, further comprising reporting errors and corrections between the airborne components of the first aircraft and the ground-based components.

10. The method of claim 8, further comprising receiving the new flight information from one or more of a customer airline and an official body.

11. The method of claim 8, further comprising receiving the new flight information at the data centre via secure web connections.

12. The method of claim 8, wherein the flight information comprises one or more of NOTAMs, navigation data, weather data and airline data.

13. The method of claim 8, wherein the electronic documents comprise one or more of route manuals, maps, charts, and airline manuals.

* * * * *